United States Patent Office 3,563,669
Patented Feb. 16, 1971

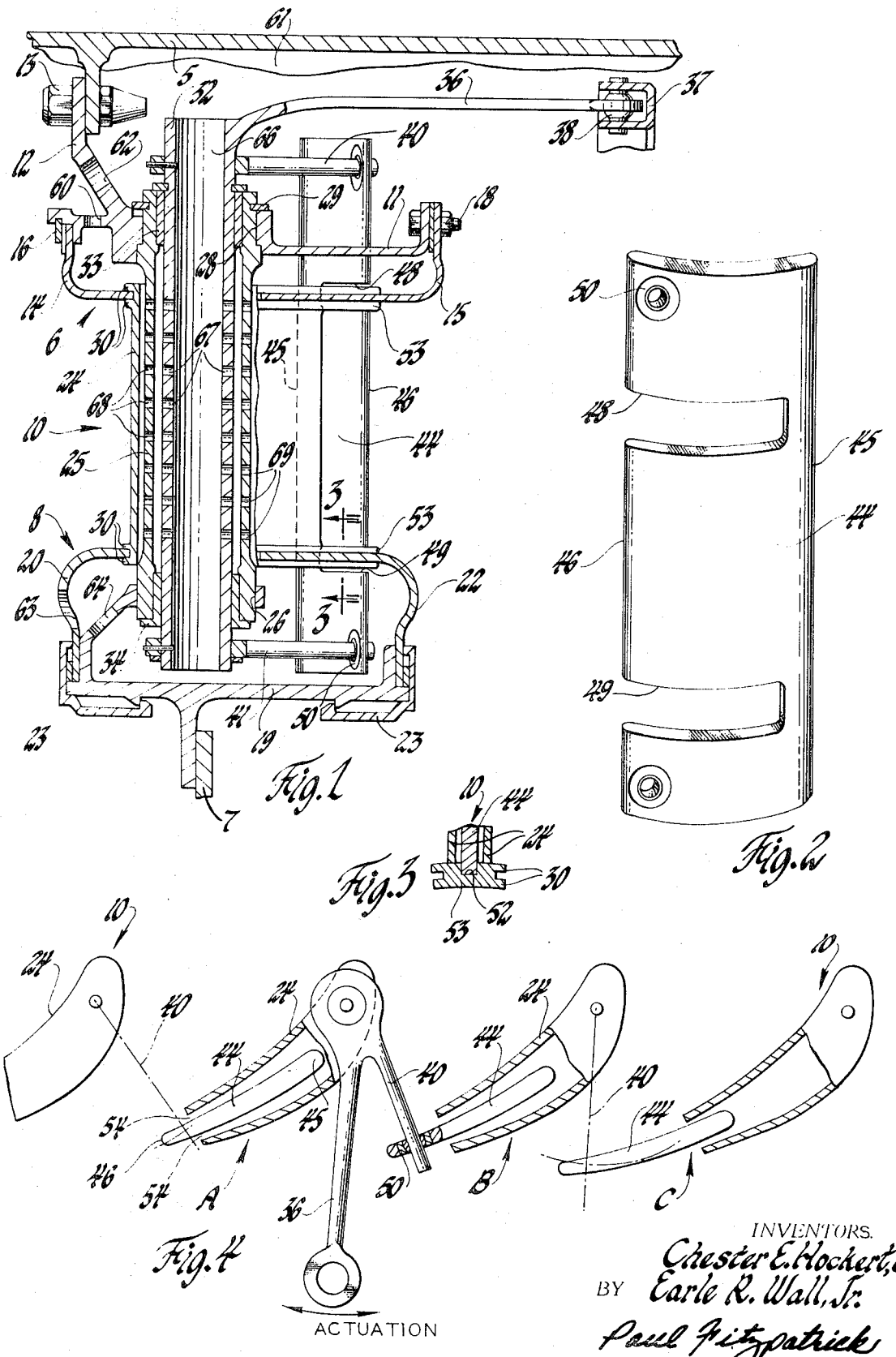

3,563,669
VARIABLE AREA NOZZLE
Chester E. Hockert and Earle R. Wall, Jr., Indianapolis, Ind., assignors to General Motors Corporation, Detroit, Mich., a corporation of Delaware
Filed July 10, 1969, Ser. No. 840,625
Int. Cl. F01d 5/14, 25/02
U.S. Cl. 415—115                                   5 Claims

ABSTRACT OF THE DISCLOSURE

A variable area turbine nozzle includes vanes having the major portion of the vane fixed to the nozzle shroud and having a trailing edge portion which may be reciprocated chordwise of each vane to vary the nozzle throat area. The trailing edge portions are moved by arms fixed on shafts which extend through the adjacent vanes, these shafts being coupled to a device for rotating them in unison. Provisions for cooling the interior of the fixed portion of the vane and flowing the cooling air over the surface of the movable portion are included.

---

The invention herein described was made in the course of work under a contract or subcontract thereunder with the Department of Defense.

Our invention is directed to variable vane cascades, suitable for use as stators in turbomachines such as compressors and turbines, among other uses. It is also directed to a variable area turbine nozzle structure having provisions for cooling the nozzle so that the preferred structure according to the invention provides a variable nozzle adapted for very high temperature use.

In a structure according to our invention, each vane of the turbine nozzle or other cascade embodies a fixed portion defining a leading edge and the major portion of the side walls of the vane. It also includes a trailing edge portion slidable chordwise of the vane into and out of the open downstream edge of the fixed portion of the vane. The adjustable trailing edge portions extend through the facings of the shrouds on which the fixed vane portions are mounted and are coupled to arms extending from shafts rotatably mounted in adjacent vanes of the nozzle. The structure includes means for cooling the surfaces of the vanes and shrouds exposed to hot motive fluid.

The principal objects of our invention are to provide a practical variable area vane cascade arrangement; to provide a variable vane cascade in which the variation is accomplished by variations of the chord of the vanes; to provide a variable vane cascade particularly adapted for high temperature service; and to provide a variable vane cascade having simple and reliable structure particularly adapted to the requirements of practice.

The nature of our invention and its advantages will be clear to those skilled in the art from the succeeding detailed description of the preferred embodiment of the invention and the accompanying drawings thereof.

FIG. 1 is a sectional view of a variable turbine nozzle taken in a plane containing the axis of rotation of the turbine, and with parts broken away and in section.

FIG. 2 is an axonometric view of a trailing edge portion of a vane.

FIG. 3 is a fragmentary sectional view taken on the plane indicated by the line 3—3 in FIG. 1.

FIG. 4 is a somewhat schematic rendition of a portion of a vane cascade illustrating the vane actuation arrangement and the range of adjustment of the trailing edge portion.

Before proceeding to a description of the structure in which our invention is particularly embodied, it is well to point out that the structure, except as otherwise described, may be of a type shown in the copending application, of common ownership with this, of Earle R. Wall for Variable Turbine Nozzles, Ser. No. 836,423, filed June 25, 1969. To the extent that the structures disclosed herein correspond to those of the Wall application, they may not be described in full detail; but reference may be made to that application for such details. We believe, however, that all structure is described herein to the extent requisite to a full understanding of our invention.

Referring first to FIG. 1, this illustrates a variable nozzle or stator ring for an axial flow turbine, which may be of various known types. The turbine includes a case 5 to which is fixed the outer shroud ring 6. The turbine also includes a support 7 within the engine which is fixed, by means not illustrated, to the turbine case 5. An inner shroud ring 8 is fixed to the support 7. Fluid flow directing vanes 10 deposited in an annular array or cascade extend radially from the outer shroud 6 to the inner shroud 8.

The outer shroud ring 6 includes a structural ring 11 including a flange 12 fixed to the case 5 by a ring of bolts 13. The outer shroud also includes a porous facing defined by an upstream facing ring 14 and a downstream facing ring 15, the former being fixed to the structural ring 11 by a snap ring 16 and the latter being secured by bolts 18. The inner shroud ring 8 includes an inner structural ring 19 having a flange fixed to the support 7 by suitable means (not illustrated). It also includes an upstream porous facing ring 20 and a downstream porous facing ring 22, these being held in place on the structural ring 19 by rings 23 which snap into place, this structure being part of the subject matter of the Wall application. The division of the porous facings into upstream and downstream rings provides for mounting them around the vanes 10.

Each vane 10 includes a preferably cast metal airfoil portion or blade facing 24 which defines the leading edge and side wall portions of the blade except the trailing edge portion, and defines complete airfoil sections at the ends 53 of the vanes. The airfoil 24 is fixed to a tubular spine 25 which extends to the structural rings 11 and 19 and supports the vane from them. The spine 25 is slidably mounted in a bore 26 in a flange of the inner structural ring 19 and is fixed to the outer structural ring 11, the outer end of the spine extending through a hole 28 in the ring and being retained by a contracting snap ring 29. The vane 24 bears flanges 30 which project over the inner and outer faces of the porous facing rings to minimize leakage of cooling air between the facing rings and the vane airfoil.

An actuating shaft 32 extends through the spine 25, being mounted in bushings 33 and 34 at opposite ends of the spine. Each shaft 32 is integral with a drive arm 36 which couples it to a unison ring or actuating ring 37 through a spherical bearing arrangement 38. Rotation of the unison ring 37 about the axis of the turbine causes all of the shafts 32 to move equally. The structure by which ring 37 is moved may be of any suitable type including the one described in the Wall application referred to above.

Shaft 32 has pinned to it two actuating arms 40 and 41, the former being radially outward of the outer shroud and the latter being disposed within the inner shroud. In the preferred embodiment, the arms 40 and 41 are suitably coupled to the trailing edge portions 44 of the next adjacent vane, generally as indicated in FIG. 4.

The trailing edge portion, as shown most particularly in FIG. 2, is of any suitable shape and in the particular embodiment is a slightly curved plate having rounded edges, an upstream edge 45 and a downstream edge 46. As will be more clearly apparent from FIG. 3, the trailing edge portion 44 is guided in a chordwise extending slot 52 in the end portion 53 at each end of the vane 10 which bears the flanges 30 adjacent the trailing edge portion 44. A space or gap 54 is left between the downstream edge of the fixed vane portion and the trailing edge portion 44 at each face of the trailing edge portion for air to escape from within the vane portion 24 and flow over the surfaces of the trailing edge portion.

Cooling air to cool the shrouds 6 and 8 and vanes 10 may be supplied in any suitable manner, the arrangement illustrated being similar to that disclosed in the Wall application referred to above. Air from any suitable source such as the compressor of a gas turbine engine, which may be combustor jacket air, may enter the outer shroud between the structural ring 11 and the facing through a ring of holes 60 in the structural ring. Air may enter the interior of hollow shaft 32 from a space 61 within the turbine case supplied through holes 62 in the flange 12. Air may enter the inner shroud assembly 8 through a ring of holes 63 in the forward face of ring 20 and holes 64 in the structural ring 19. Thus, the shroud rings are supplied with cooling air which may diffuse through the porous rings 14, 15, 20, and 22 for transpiration cooling as described in the Wall application referred to above.

The cooling air flows into the passages 66 defined by the hollow shafts 32 from both ends (or either end) and is discharged through holes 67 distributed along the shaft within the span of vane 10 into the interior of spine 25. Spine 25 is provided with holes, some of which may be holes 68 to direct the cooling air against the leading edge of the airfoil 24 for impingement cooling at that point. Other holes 69 may be provided in the downstream surface of spine 25 or distributed around its periphery. The cooling air thus introduced into the vane flows over the interior of the walls of the vane for convection cooling and through the gaps 54 between the fixed body and the movable trailing edge portion 44, thus providing film cooling of the trailing edge portion.

The operation of the nozzle should be clear from the foregoing description, but may be reviewed briefly. Gas from a suitable source such as the compressor and combustion chamber of a gas turbine flows through the nozzle structure between the shrouds 6 and 8 and between adjacent vanes 24 to any suitable turbine rotor structure. By operation of the unison ring 37 by any suitable actuator, the shafts 32 and arms 40 and 41 are rotated to vary the degree of projection of the trailing edge portion 44 from the downstream edge of the vane portion 24. This movement brings the trailing edge closer to or farther away from the adjacent vane to vary the throat area of the turbine nozzle. Extreme positions of the trailing edge are indicated at A and C in FIG. 4 and an intermediate position at B.

The arrangements for cooling are, in the main, similar to those of the above-mentioned Wall application but have been modified to suit the requirements of the variable nozzle structure of this invention. The variable nozzle structure may be employed apart from the cooling means, depending upon the requirements of the particular installation for protection from high temperature motive fluid.

It should be clear to those skilled in the art from the foregoing that we have devised a new and improved structure of a variable area turbine nozzle or equivalent device and also have provided particularly suitable means for cooling such a structure.

The detailed description of the preferred embodiment of the invention for the purpose of explaining the principles thereof is not to be considered as limiting or restricting the invention, since many modifications may be made by the exercise of skill in the art.

What is claimed is:

1. A turbomachine structure comprising, in combination, first and second annular shrouds defining between them a flow path for fluid, an annular cascade of fixed flow directing vanes each extending from one shroud to the other, each vane including a hollow fixed portion having a leading edge and faces extending downstream from the leading edge and an adjustable trailing edge portion movable chordwise of the vane so as to vary the chord of the vane and the intervane throat areas, a rotatable shaft extending through each vane, actuating means coupling the shafts for concurrent rotation, and arms on each shaft coupled to opposite ends of the trailing edge portion of an adjacent vane for joint adjustment of the trailing edge portions.

2. A structure as defined in claim 1 including means on each fixed portion guiding the movement of the trailing edge portion.

3. A structure as defined in claim 2 including a connection slidable axially of the arm between each said arm and the trailing edge portion.

4. A structure as defined in claim 1 including means for supplying a cooling fluid to the vane and discharging it as a film over the faces of the trailing edge portion.

5. A turbomachine structure comprising, in combination, first and second annular structures defining between them a flow path for fluid, an annular cascade of fixed flow directing vanes extending between the said structures, each vane including a hollow fixed portion having a leading edge and faces extending downstream from the leading edge and an adjustable trailing edge portion movable chordwise of the vane into and from the fixed portion so as to vary the chord of the vane, the trailing edge portion being mounted between and spaced from the said faces to define a film cooling air outlet slit at each side of the trailing edge portion, and means for introducing a cooling fluid to the fixed portion for discharge through the said slits.

References Cited

UNITED STATES PATENTS

| 2,774,308 | 12/1956 | Ulunder et al. | 416—23 |
| 2,847,185 | 8/1958 | Petrie et al. | 415—115 |
| 3,433,015 | 3/1969 | Sneeden | 416—231 |

FOREIGN PATENTS

| 504,336 | 4/1939 | Great Britain | 416—23 |
| 139,730 | 8/1930 | Switzerland | 415—148 |
| 893,054 | 4/1962 | Great Britain | 415—160 |

HENRY F. RADUAZO, Primary Examiner

U.S. Cl. X.R.

415—148, 160, 161; 416—231